June 2, 1953 — F. I. JOHNSON — 2,640,515
BORING OR DRILLING MACHINE AND WORK HOLDING CLAMP
Filed April 14, 1948 — 3 Sheets-Sheet 1
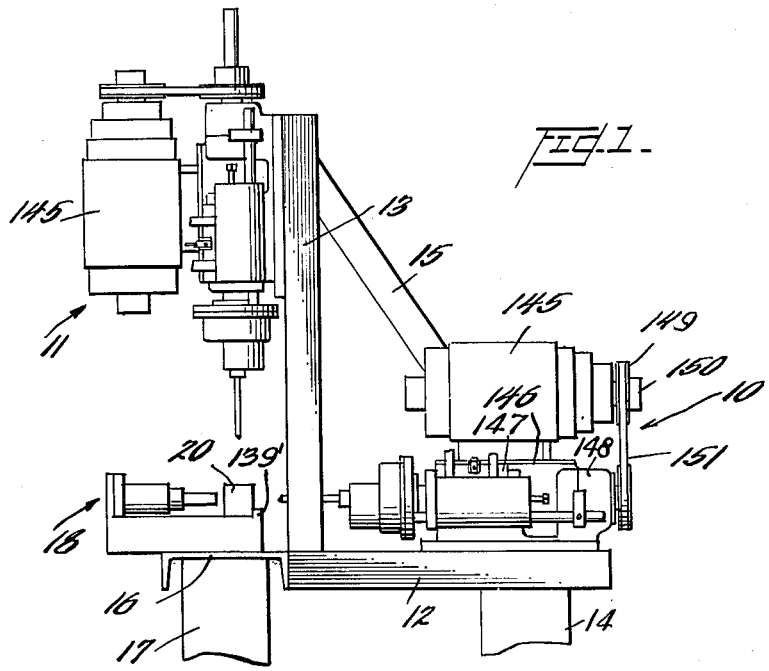
Inventor
Fred I. Johnson
ATTORNEYS June 2, 1953 — F. I. JOHNSON — 2,640,515
BORING OR DRILLING MACHINE AND WORK HOLDING CLAMP
Filed April 14, 1948 — 3 Sheets-Sheet 2
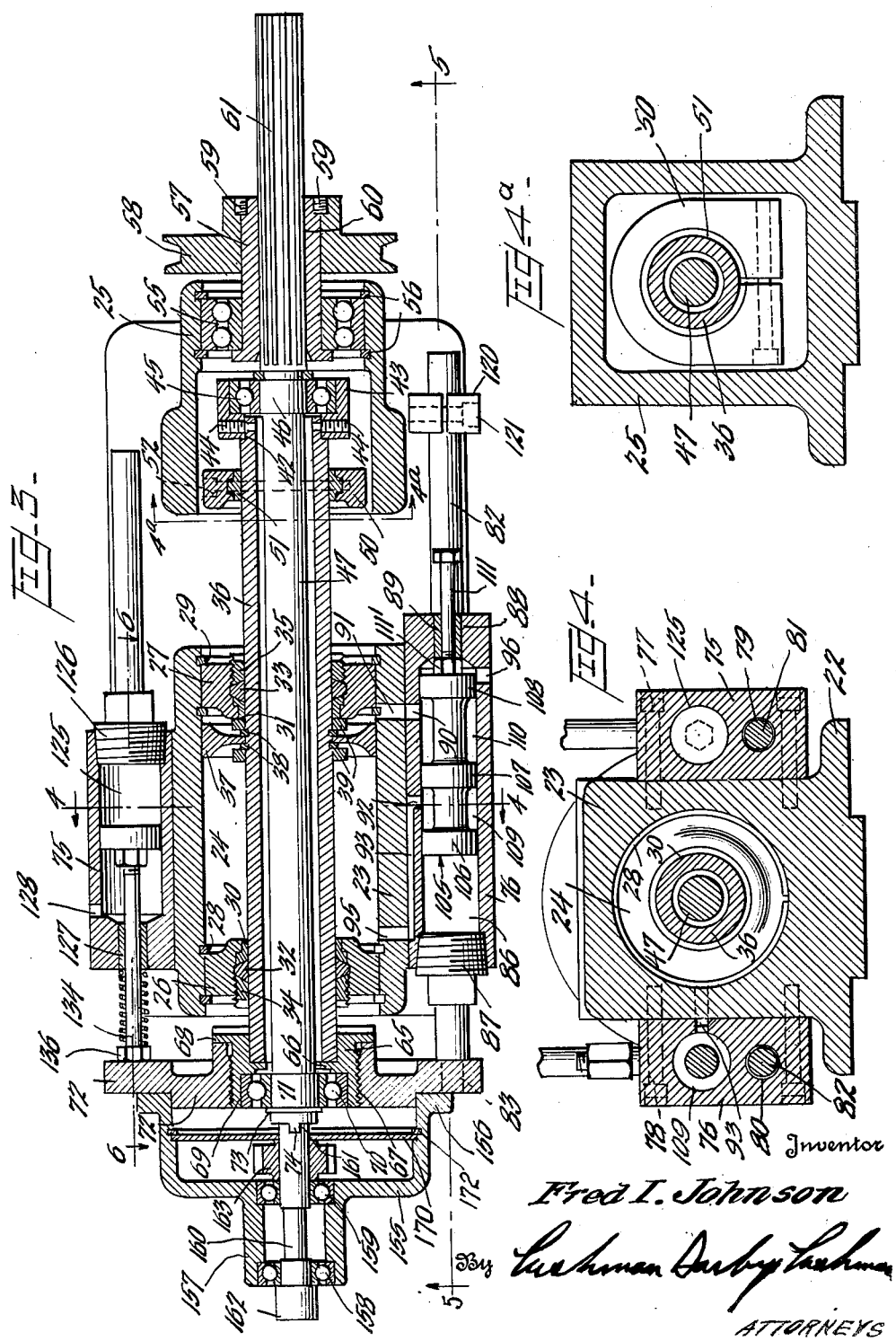
Inventor
Fred I. Johnson
By Cushman Darby Cushman
ATTORNEYS

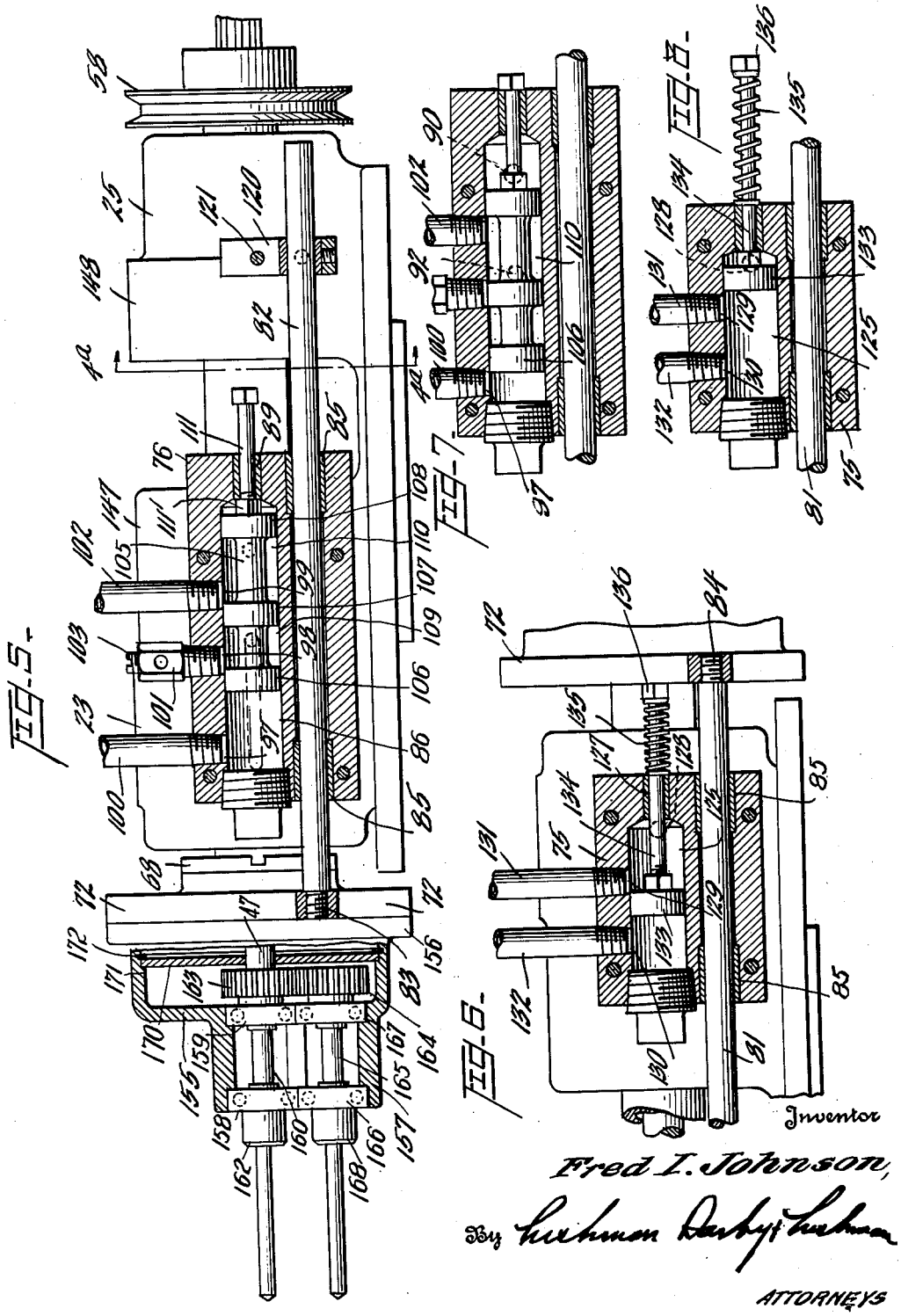

Patented June 2, 1953

2,640,515

UNITED STATES PATENT OFFICE 2,640,515

BORING OR DRILLING MACHINE AND WORK HOLDING CLAMP

Fred I. Johnson, Sheboygan, Wis., assignor to Reiss Manufacturing Corporation, Wilmington, Del., a corporation of Delaware Application April 14, 1948, Serial No. 20,924

7 Claims. (Cl. 144—92)

The present invention relates to a boring or drilling machine and, more particularly, to an automatic machine for boring one or more holes in predetermined relation in wood, metal, or other work pieces. The invention is particularly adapted for use in the wood working art, for instance, in the manufacture of furniture, in the production of holes adapted to receive dowel pins, and the like.

An important object of the invention is to provide a power actuated boring machine which is of unusual simplicity in construction, comprising a minimum of parts, is not likely to get out of order, is rugged and adapted for long, trouble-free use.

A further object is to provide means for automatically advancing the boring instrumentality into the work at a predetermined, adjustable rate.

Another object is to provide automatic means for determinating the distance of the advance of the drill or drills and to return them to their initial, starting position.

A further object is to provide, in combination with a boring machine, a power actuated work clamping mechanism and cooperating means between the boring machine and the mechanism, serving automatically to actuate the latter, to hold the work in predetermined position, when the operation of the boring machine is initiated. In this connection, another object is to provide an interrelation between the drilling and clamping instrumentalities in the machine, whereby the clamp is actuated automatically as the drill approaches the work and is released automatically, after the drilling has been completed and when the drilling instrumentalities have been returned to their original, starting position.

A further object of the invention is to provide improved, fluid control and actuating systems for boring machines and work clamping devices associated therewith, to the end that the operations of the machine may be initiated manually, and automatically and adjustably controlled throughout a complete cycle, and the work clamping means controlled automatically, in timed relation to the operations of the boring machine.

Another object of the invention is to provide a unitary boring machine which may receive, interchangeably, a plurality of different types of boring heads, and which, itself, may be mounted upon suitable supports, in any desired relation to the work clamping mechanism, so as to approach the work at any desired angle. As noted below, the invention contemplates the use of a plurality of such unitary machines, adapted to approach and operate upon the work from a plurality of different angles.

Other and further objects and advantages of the invention will be apparent from a consideration of the following description of a specific embodiment, shown for purposes of illustration in the accompanying drawings, in which:

Figure 1 is a side elevation on a reduced scale, showing a clamping mechanism and two boring units, arranged to operate upon a work piece at an angle of substantially 90°;

Figure 2 is a diagrammatic plan view, showing the boring machine, one form of work clamp and the fluid control system;

Figure 3 is a horizontal section through the boring machine;

Figure 4 is a transverse section on the line 4—4 of Figure 3;

Figure 4a is a section on line 4a—4a of Figure 3;

Figure 5 is a vertical longitudinal section and partial side elevation taken on line 5—5 of Figure 3;

Figure 6 is a fragmentary longitudinal, vertical section taken on line 6—6 of Figure 3;

Figure 7 is a fragmentary view of the valve shown in Figure 5, in the opposite position; and Figure 8 is a view of the valve shown in Figure 6, in the opposite position.

As indicated in Figure 1, a pair of boring machine units 10 and 11 may be mounted upon horizontal and vertical frame elements 12 and 13, carried by a post 14 and re-enforced by a brace 15, or the like. The supporting structure may be positioned adjacent a channel frame member 16 or the like, carried by a post 17, upon which a work holding clamp mechanism 18 may be mounted. A work piece 20 carried by the clamp is thus held in position to be operated upon by the two units, so that holes disposed at 90° angles may be bored in two different faces thereof simultaneously. Of course, the boring units may be mounted for adjustment along their supporting frame members, toward and away from the work, by any suitable means, and any number of units supported by frame members arranged at any suitable angles may be employed.

Referring to Figures 3 to 5, each boring machine unit comprises a base casting 22 having at its forward end an integral, upwardly projecting cylinder block 23, provided with a cylindrical interior 24, and, at its rear end, an upwardly projecting enlarged boss 25, centrally bored to provide a bearing support, as hereinafter described.

The opposite ends of the cylinder 24 are closed by cylinder heads 26 and 27, held in place by pairs of expansible snap rings 28 and 29, disposed in suitable annular grooves. The cylinder heads are centrally apertured, shouldered and threaded to receive Babbit bushings 30 and 31, packing rings 32 and 33 and gland nuts 34 and 35, thereby making a substantially tight fluid joint with the exterior surface of an elongated hollow shaft or sleeve 36, slidable longitudinally through the cylinder heads.

The sleeve 36 carries a piston 37 which is restrained against axial movement with respect thereto by contractible snap rings 38, disposed in suitable annular grooves in the periphery of the sleeve. On opposite sides of the rings 38, bumper rings 39 of rubber or the like may be arranged to absorb shock, as the piston 37 approaches the heads 26 and 27 at opposite ends of the cylinder.

The rear end of the sleeve 36 is circumferentially shouldered, as at 42 for the reception of a cup member 43, held in place by set screws 44 and serving as a housing for the outer race of a ball bearing assembly 45, the inner race of which supports an enlarged portion 46 of an inner shaft 47, constituting the drive shaft for the drill head, as hereinafter explained.

Between the cup member 43 and the cylinder head 27, the sleeve 36 carries a stroke adjusting block 50 which may be clamped upon the sleeve in longitudinally adjusted position, to limit the stroke of the piston and the sleeve. This member may comprise a generally U-shaped split block having a circular central bore provided with a soft metal lining 51. A clamping screw 52 may be used for tightly drawing the legs of the block together, to clamp the block on the sleeve at any desired position of longitudinal adjustment.

The hollow boss 25 projecting upwardly from the rear end of the base constitutes a support for the outer race of a ball bearing assembly 55, which may be held against longitudinal movements by a pair of expansible snap rings 56, disposed in annular grooves formed in the interior thereof. An elongated hub 57, made of bronze or other bearing material, is mounted for rotation with the inner race of the bearing assembly 55, and carries a V belt pulley 58, on its rear end, held in position by set screws 59. The hub is provided with a splined interior surface 60, mating with the splined rear end 61 of the shaft 47. Hence, relative rotation between pulley 58, hub 57 and shaft 47 is prevented, but the shaft may reciprocate axially through the hub 57. The pulley 58, of course, could be replaced by a gear, which could be driven through a gear train from a suitable source of power.

At its forward end, the hollow shaft or sleeve 36 is pressed into the central bore of a hub 65 having an inwardly projecting, intermediate flange 66, against which the end of the sleeve abuts, an exteriorly threaded terminal portion 67, an outwardly projecting rear flange 68, and a cylindrical, enlarged interior 69 at its forward end. The enlargement 69 receives the outer race of a ball bearing assembly 70, the inner race of which supports an enlarged portion 71 of the drive shaft 47. The threaded section 67 of the hub makes engagement with an internally threaded central aperture in a face plate 72, constituting the support for interchangeable drill heads, hereinafter referred to. It should be noted that the forward end portion of the shaft 47, immediately beyond the enlargement 71, is peripherally grooved to receive a contractible snap ring 73, to prevent axial movement of the shaft relative to the bearing 70, and that the forward end face of the shaft is provided with a forwardly projecting diametric rib 74.

As best shown in Figures 4, 5, and 6, the side faces of the cylinder block 23 carry combined valve housings and guide blocks 75 and 76, held in place by suitable cap screws 77 and 78. The blocks are provided with longitudinally extending cylindrical bores 79 and 80 through which guide rods 81 and 82 extend for axial sliding movement, the rods having at their forward ends threaded connections 83 and 84, with the face plate 72. Suitable bushings 85 of bronze or the like may be pressed into the ends of the bores 79 and 80, to facilitate sliding movement of the guide rods therethrough. It will be understood that the guide rods permit longitudinal movement of the face plate, but positively prevent turning movement thereof.

Referring to Figure 3, the combined valve housing and guide block 76 is provided with a cylindrical bore 86, constituting a valve chamber, closed at its forward end by a threaded plug 87, and having a reduced rear end 88 in which a bronze sleeve 89 is disposed for the reception in fluid-tight relation of a valve stem, hereinafter described.

The valve chamber 86, adjacent its rear end but spaced therefrom, has a port 90 communicating with a passage 91 in the cylinder block 23 opening into the rear end of the cylinder 24. At a point substantially mid-way in the length of the valve chamber 86, there is another port 92 communicating with a passage 93, formed in the wall of block 76 and communicating with a port 95, leading into the forward end of the cylinder 24. At the extreme rear end of the valve chamber 86, there is another port 96, leading directly to the atmosphere.

As shown in Figure 5, the upper portion of the block 76 is provided with three threaded bores or ports 97, 98 and 99, to which are connected, respectively, a pipe 100, an air escape fitting 101 and a pipe 102. The fitting 101 includes an adjustable screw 103, adapted to meter the flow of air from the interior of the valve chamber, to the atmosphere, during a certain position of the valve body, as hereinafter explained.

Within the valve chamber, there is disposed for sliding movement, a valve body 105 having three enlargements or heads 106, 107 and 108, making substantially fluid-tight, sliding engagement with the inner surface of the chamber 86 and providing two circumferentially continuous, reduced areas 109 and 110. The rear end of the valve body is drilled and tapped for the reception of a threaded valve stem 111, locked in place by a nut 111' and extending through the bronze bushing 89, heretofore mentioned.

Referring to Figure 2, fluid, such as air under pressure, may be delivered to the system from any suitable source of supply by a pipe 112, having a manual cut-off valve 113 therein. Pressure air flows from a suitable union 114 through a line 115 to a normally closed valve 116, having a push button 117 associated therewith and adapted to deliver air, when manually actuated, to the pipe 100, and adapted, when released, to permit escape of air from pipe 100 to atmosphere through a vent 118.

Air under pressure also may flow from the union 114 to the valve casing through pipe 102, heretofore mentioned.

The valve mechanism and the system just described operate as follows:

Assuming that the parts are in the position shown in Figures 2 and 7, the push button 117 (Figure 2) is operated to deliver pressure air to pipe 100 and through the valve control port 97 to the forward end of the valve chamber, ahead of the piston-like head 105 of the valve body, thereby immediately driving the valve body rearwardly from the position shown in Figure 7, to that shown in Figures 3 and 5. Air under pressure now flows from pipe 102 through the power fluid inlet port 99 into the space 110 between heads 107 and 108 through port 90 and passage 91, to the rear end of the cylinder 24, behind piston 37, thus tending to move the cylinder and the associated parts forwardly. The air in the cylinder ahead of the piston is in communication through port 95, passage 93 and port 92 with the space 109, between enlargement 106 and 107 and this space, in turn, is in communication through port 98 with the metered escape fitting 101. Hence, the air is permitted to escape to the atmosphere at an accurately controlled rate, depending upon the position of adjustment of screw 103, which, in turn, controls the speed of advance of the piston and the parts associated therewith.

As shown in Figures 3 and 5, the guide rod 82 carries an adjustably mounted block 120, consisting of a split, U-shaped element having its legs projecting upwardly and adapted to be drawn together in clamping relation by a screw 121. By loosening the screw, the block may be shifted longitudinally along the shaft and secured in the desired, adjusted position, by tightening the screw. The block projects upwardly into axial alignment with the valve stem 111 and, as the piston, the face plate 72 and the guide rods 81 and 82 move forwardly, under the influence of the pressure air, as just described, the block engages the rear end of the stem 111 and moves the stem and the valve body 105 forwardly, or to the left, from the position shown in Figures 3 and 5 to the position shown in Figure 7.

When this occurs, the air in the chamber 86, between the head 106 and the plug 87 flows through the pipe 100 and escapes to atmosphere through port 113 of valve housing 116. Simultaneously, air under pressure from power fluid pipe 102 flows through the space 110 between enlargements 107 and 108 to port 92, and from this point through passage 93 (Figure 3) to port 95, ahead of the piston 37, thereby tending to drive the same rearwardly. The air behind the piston 37 may flow, unhindered, to atmosphere through passage 91, port 90 and the space behind the head 108 in the valve chamber and through the second escape port 96. Thus, the return of the parts to their original position is effected and they remain in this position until the valve body is again shifted rearwardly, by the delivery of air from the valve 116 to the space ahead of the valve body 105.

Referring to Figures 3, 6 and 8, the combined guide block and valve housing 75 is bored to provide a valve chamber 125, closed at its rear end by a threaded plug 126 and having a reduced portion at its forward end, lined by a bronze bushing 127, having fluid-tight fit with a valve stem, hereinafter described. Adjacent its forward end, the chamber 125 has an escape port 128 communicating directly with atmosphere. In its top wall, the block is provided with a pair of threaded ports 129 and 130 to which pipes 131 and 132 are connected. A cylindrical valve body 133, slidably mounted in the valve chamber 125 in fluid-tight relation, has a forwardly projecting stem 134, extending through the bushing 127. A compression spring 135 is coiled about the terminal portion of the stem, between the head 136 thereof and the forward end face of the block 75, thereby constantly urging the valve body forwardly to the left in Figure 3 and to the right in Figures 6 and 8.

Referring to Figure 2, the line 132, which enters the chamber 125, behind the valve body 133, is in communication with the union 114 and therefore, delivers air under pressure to the valve chamber. The pipe 131 leads to the work clamping mechanism or assembly 18. The latter may comprise a cylinder 138, to the interior of which the pipe 131 is connected, a piston (not shown) and a piston operated clamping member 139, normally held in retracted, inoperative position by an internal spring or the like, not shown. The movable clamping jaw 139 cooperates with a fixed abutment or jaw 139', to hold the work in the desired position.

When the parts are in the position shown in Figures 2, 3 and 6, with the face plate 72 in its rearwardly retracted position, the plate is in abutment with the head 136 of valve stem 134, and the valve body 133 is in the rearwardly projected position, between ports 130 and 129, with the pipe 131 in communication with atmosphere through port 128. Hence, the spring associated with the clamping assembly 18 is effective to maintain the clamp open. When the face plate and the parts associated therewith start their forward movement, as explained above, the plate moves away from the valve stem 134, permitting the compression spring 135 to move the valve body 133 forwardly to the position shown in Figure 8. This movement establishes communication from pipe 132 to pipe 131 and blocks communication between pipes 131 and the escape port 128. Hence, air under pressure flows immediately through the valve chamber to the cylinder 138, thereby projecting the clamp 139 into operative engagement with the work, to grip the same firmly, before the drill has reached the work for boring purposes.

The clamping mechanism remains in this operative position throughout the drilling operation and, continuously, until the completion thereof and until the drill head and the face plate 72 have returned substantially to their starting position. During the last portion of this return movement, the face plate 72 engages the head 136 of the valve stem 134 and shifts the body 133 rearwardly to the position shown in Figures 3 and 6, thereby establishing communication between the pipe 131 and the escape port 128, and cutting off the supply of air under pressure from pipe 132 to pipe 131. Hence, the spring associated with the clamp mechanism withdraws the work engaging member 139 and releases the work.

Motive power for rotating the drive shaft 47 may be supplied by an electrical motor 145 (Figure 1) having a supporting bracket or base 146, secured by screws or the equivalent upon the flat upper surfaces 147 and 148 of the cylinder block 23 and the enlarged boss 25. The motor is preferably provided with a V pulley 149, fast on its shaft 150 in alignment with the pulley 58 and connected thereto by a V belt 151.

As noted above, the face plate 72 may constitute the support for any one of a plurality of different types of drill heads. As shown in Figures 3 and 5, the drill head is of the double stem type and comprises a cast housing 155 having a rear, marginal flange 156 secured by screws or the like to the face plate, and a forwardly projecting hollow boss 157 in which a pair of spaced ball bearing assemblies 158 and 159 are mounted for the reception of a drill spindle 160 having its rear end diametrically slotted as at 161, for the reception of the rib 74 on the drive shaft 47, and carrying a drill bit receiving socket 162 at its forward end.

The spindle 160 may have secured to its rear portion a spur gear 163 in mesh with a similar spur gear 164 fast on a second spindle 165 journalled in ball bearing assemblies 166 and 167, carried by the forwardly projecting boss 157. The spindle 165 similarly carries at its outer end a drill bit receiving socket 168. Rotation, of course, is imparted to the second spindle from the first through the intermeshing gears in an opposite direction and drills of opposite hand should be used in the two sockets.

The gears, bearings and spindles in the drill head are enclosed by a rear cover plate 170, seated against a shoulder 171 and held in place by an expansible snap ring 172 disposed in a groove in the inner face of the housing 155. Thus, the drill heads may be readily removed, as units, and replaced by other heads having different numbers or different spacings of drill bit holding spindles.

The operation of the valve for controlling the delivery of air to the cylinder 24, for advancing and retracting the drill head, and the operation of the valve 75 for controlling the delivery of air to the clamp has been described in detail above. In the normal operation of the apparatus, the manual valve 113 is opened, the motor 145 is set in motion and a piece of work 20 is placed in the now open clamp. The pushbutton 117 is manually actuated, to deliver air to the left hand end of valve 76, whereupon the body 105 is shifted to the right and air is delivered from the line 102 through the valve to the right hand end of cylinder 24, thereby advancing the drill head toward the work. When the drill head moves away from rod 134 (Figure 3), the valve 133 in valve housing 75 is shifted by the spring 135, thereby delivering air to the cylinder 138 of the clamping mechanism, so that the work is clamped before the drill reaches it. When the drill has advanced to a predetermined depth in the work, the block 120 strikes the end of the valve stem 111, shifting the valve to the position shown in Figure 7 so that air is delivered to the opposite end of the cylinder and the piston and drill head are retracted. When the drill head reaches the fully retracted position, the valve stem 136 is engaged thereby, the valve is shifted and the clamp is opened. The parts are now ready for the next cycle of operations.

It is thought that the structure and mode of operation of the apparatus of the present invention will be apparent from the foregoing description. The invention, of course, is not limited to the details of construction described above and shown in the accompanying drawings, but includes all modifications coming within the scope of the appended claims and their equivalents.

I claim:

1. A boring or drilling machine comprising a drill head, a rotatable drill actuating shaft connected to the head, a non-rotatable, reciprocable sleeve surrounding the shaft connected to the head, a cylinder through which the sleeve extends, a piston in the cylinder operatively connected to the sleeve to advance and retract the head, a combined valve housing and guide block secured to said cylinder, a shiftable valve in said housing for controlling the delivery and escape fluid to and from both ends of the cylinder alternately, fluid pressure means for shifting the valve to the position to advance the piston and said head, a reciprocable guide rod rigidly connected to the head for movement therewith and slidably disposed in said guide block to restrain said head against rotation, and means carried by the guide rod for engaging and shifting the valve to the other position after a predetermined advance of the head and the rod.

2. A boring or drilling machine comprising a drill head, a reciprocable guide rod rigidly connected thereto, and projecting rearwardly therefrom, a rotatable drill actuating shaft connected to the head, a non-rotatable reciprocable sleeve connected to the head, a cylinder through which the sleeve extends, a piston in the cylinder operatively connected to the sleeve to advance and retract the head, a shiftable valve for controlling the delivery and escape fluid to and from both ends of the cylinder alternately, means for shifting the valve to advance the piston and said head, a guide block connected to the cylinder through which the guide rod extends, to restrain the head against rotation, and means carried by the guide rod and mounted for longitudinal adjustment thereon for engaging and shifting the valve to the other position after a predetermined advance of the head and the rod.

3. In combination, a work holding clamp and a boring machine positioned to operate upon work held by said clamp, said clamp comprising a fixed member and a normally retracted, movable work engaging member, a cylinder-piston assembly connected to advance the movable member into work engaging relation when air under pressure is delivered thereto, and an air conduit leading to said assembly, said boring machine comprising a drill head movable toward and from said clamp, a shiftable valve arranged, in one position, to deliver air under pressure to said conduit and in the other position to permit discharge of air therefrom to atmosphere, an abutment carried by the head, positioned when the head is withdrawn from the clamp, to engage said valve and to maintain the same in the second mentioned position, said abutment being disengageable from the valve upon initiation of movement of the head toward the clamp, and means for shifting the valve to the first position when so disengaged by the abutment.

4. In combination, a work holding clamp and a boring machine positioned to operate upon work held by said clamp, said clamp comprising a fixed member and a normally retracted, movable work engaging member, a cylinder-piston assembly connected to advance the movable member into work engaging relation when air under pressure is delivered thereto, and an air conduit leading to said assembly, said boring machine comprising a drill head movable toward and from said clamp, a shiftable valve arranged, in one position, to deliver air under pressure to said conduit and in the other position to exhaust air therefrom to atmosphere, an abutment carried by the head, positioned when the head is withdrawn, to engage and shift the said valve to the second mentioned position, said abutment being disengageable from said valve upon initiation of movement of the head toward the clamp, and means for shifting the valve to the first mentioned position when so disengaged by the abutment whereby the work is clamped as the head approaches the clamp, said mechanism being shifted to the second position by said abutment surface upon return of the head to its original position, to release the work from the clamp.

5. In a boring machine; a cylinder having centrally apertured heads at its ends, a sleeve slidably mounted in fluid-tight relation in the apertures in said heads, a member non-rotatably fixed to one end of the sleeve, a piston fast on said sleeve in the cylinder, a rotatable shaft extending through the sleeve having a splined rear end and a forward end journalled in the member, a rotatably mounted hub having a splined connection with the rear end of the shaft, means for rotating the hub and the shaft, rearwardly projecting guiding rods attached to said member, guide blocks fixed with respect to the cylinder providing guide ways slidably receiving the guiding rods, thereby preventing rotation of the member and the sleeve, and means for delivering fluid to the cylinder to reciprocate the piston, the sleeve, the member, the guiding means and the rotatable shaft.

6. In a boring machine; a cylinder having centrally apertured heads at its ends, a pair of valve housings fixed to the cylinder having guideways therein, one of said housings having ports communicating with the interior of the cylinder, a sleeve slidably mounted in fluid-tight relation in the apertures in said heads, a member non-rotatably fixed to one end of the sleeve, a piston fast on said sleeve in the cylinder, a pair of guide rods carried by the member extending through the said guideways and thereby preventing rotation of the member relative to the cylinder, means extending through the sleeve for delivering power to the member, and means for delivering fluid under pressure to said one of said valve housings and to the cylinder to reciprocate the piston, the sleeve, the member and the guide rods.

7. In a boring machine; a cylinder, a pair of valve housings fixed to the cylinder, each having a guideway therein, a valve body in each housing having a stem projecting outwardly therefrom, a member at the forward end of the cylinder, guide rods extending rearwardly from the member and slidable in the guideways in said housings, a piston in the cylinder for reciprocating the member and the guide rods, means movable with the member and rods having surfaces positioned to engage and disengage the valve stems to control the positions of the valve bodies, and means controlled by one of said valve bodies for delivering fluid to the cylinder to reciprocate the piston, the member and the guide rods.

FRED I. JOHNSON.

References Cited in the file of this patent

UNITED STATES PATENTS

| Number | Name | Date |
| --- | --- | --- |
| 526,930 | Maxon | Oct. 2, 1894 |
| 1,460,874 | White | July 3, 1923 |
| 1,700,668 | Danerell | Jan. 29, 1929 |
| 1,931,452 | Wheeler | Oct. 17, 1933 |
| 1,973,204 | Goss et al. | Sept. 11, 1934 |
| 1,998,873 | Kingsbury | Apr. 23, 1935 |
| 2,013,420 | Opel | Sept. 3, 1935 |
| 2,178,364 | Svenson | Oct. 31, 1939 |
| 2,190,284 | Foshie | Feb. 13, 1940 |
| 2,221,279 | Wheeler | Nov. 12, 1940 |
| 2,261,055 | Dulaney | Oct. 28, 1941 |
| 2,430,019 | Jenkins | Nov. 4, 1947 |